United States Patent [19]
Krall

[11] Patent Number: 5,207,356
[45] Date of Patent: May 4, 1993

[54] SELF-DRAINING CONTAINER

[75] Inventor: Thomas J. Krall, Toledo, Ohio

[73] Assignee: Owens-Illinois Plastic Products Inc., Toledo, Ohio

[21] Appl. No.: 834,069

[22] Filed: Feb. 10, 1992

Related U.S. Application Data

[60] Division of Ser. No. 533,632, Jun. 5, 1990, Pat. No. 5,114,659, which is a continuation-in-part of Ser. No. 314,312, Feb. 22, 1989, abandoned, which is a continuation of Ser. No. 160,478, Feb. 25, 1988, abandoned.

[51] Int. Cl.$^5$ .............................................. B67D 1/16
[52] U.S. Cl. .................................. 222/109; 222/111; 222/572
[58] Field of Search ............... 222/109, 111, 478, 484, 222/482, 481, 571, 572

[56] References Cited

U.S. PATENT DOCUMENTS

| | | |
|---|---|---|
| 2,601,039 | 6/1952 | Livingstone . |
| 2,743,844 | 5/1956 | Livingstone . |
| 2,763,403 | 9/1956 | Livingstone . |
| 2,793,790 | 5/1957 | Kahler . |
| 2,804,654 | 9/1957 | Sherman . |
| 2,911,673 | 11/1959 | Soubier . |
| 3,029,471 | 4/1962 | Adams et al. . |
| 3,364,521 | 1/1968 | Valyi . |
| 3,537,676 | 12/1967 | Miller . |
| 3,833,150 | 9/1974 | Visser-Patings . |
| 4,115,496 | 9/1978 | Krall . |
| 4,550,862 | 11/1985 | Barker et al. ....................... 222/109 |
| 4,578,028 | 3/1986 | Dirksing et al. . |
| 4,616,759 | 10/1986 | Mahler ............................. 222/109 X |
| 4,640,855 | 2/1987 | St. Clair ........................... 222/109 X |
| 4,671,421 | 6/1987 | Reiber et al. ..................... 222/109 X |
| 4,696,416 | 9/1987 | Muckenfuhs et al. . |
| 4,706,829 | 11/1987 | Li . |
| 4,929,410 | 5/1990 | Meyer et al. . |
| 4,941,815 | 7/1990 | Julian ............................... 222/109 X |
| 4,989,757 | 2/1991 | Krall ................................. 222/111 |
| 5,020,892 | 6/1991 | Darr . |
| 5,108,009 | 4/1992 | Davidson et al. .................... 222/109 |

FOREIGN PATENT DOCUMENTS

| | | |
|---|---|---|
| 240962 | 4/1960 | Australia . |
| 273089 | 5/1965 | Australia . |
| 244327 | 3/1912 | Fed. Rep. of Germany . |
| 1125509 | 10/1956 | France . |
| 461760 | 6/1952 | Japan . |
| 129658 | 10/1976 | Japan . |
| 188590 | 4/1937 | Switzerland . |
| 678883 | 9/1952 | United Kingdom . |
| 2094220 | 9/1982 | United Kingdom . |

*Primary Examiner*—Kevin P. Shaver

[57] ABSTRACT

A self-draining container includes a body, an integral wall extending upwardly from said body and encircling an integral dispensing spout which communicates with said body and extends above the top of the wall. An integral web joins the wall and the dispensing spout to form a drain channel. A drain opening is defined adjacent the channel for draining fluid from the channel into the container body. A cap having a depending skirt defining a thread which mates with an internal thread on the container wall to close the container.

15 Claims, 7 Drawing Sheets

SELF-DRAINING CONTAINER

CROSS REFERENCE TO RELATED APPLICATIONS

This is a divisional of application Ser. No. 533,632, filed Jun. 5, 1990, now U.S. Pat. No. 5,114,659, which is a continuation-in-part of application Ser. No. 314,312, filed Feb. 22, 1989, now abandoned, which is a continuation of application Ser. No. 160,478, filed Feb. 25, 1988, now abandoned.

BACKGROUND OF THE INVENTION

Self-draining containers are known in the art. These containers include means for returning contents which have dripped or run down the exterior of the pouring spout during use to the main body of the container.

Examples of prior art self-draining closures are shown in U.S. Pat. No. 4,550,862 and U.S. Pat. No. 4,640,855.

One of the primary problems with prior art self-draining containers is that they include multiple parts. In addition, prior art self-draining containers often require intermediate or post assembly steps to accomplish the self-draining feature. Additionally, in the embodiment of the container disclosed in the parent application, some difficulty has been encountered with distortion of threads in the molding operation.

SUMMARY OF THE INVENTION

The self-draining container, according to the present invention, is a single integral unit which does not include multiple parts to be assembled subsequent to forming except for application of a cap or closure to seal the package. The container is completed upon molding and post-molding operations are not required.

The container includes a body portion which terminates in an opening through which the contents can be dispensed. An integrally formed dispensing portion extends from and communicates with the body portion. The dispensing portion includes a collar or wall which extends around the body opening. An integral dispensing spout is located within and encircled by the collar. The upper end of the dispensing spout extends above the top of the collar. A web portion extends between the collar and the dispensing spout. The exterior of the spout, the web and the collar define a channel into which fluid may be received when the container is inverted. A drain opening is provided in or adjacent the bottom of the channel through which the fluid in the channel may drain back into the body of the container when the container is uprighted.

A method of molding the container is also disclosed including a method of molding which provides internal threads with superior thread definition and lack of distortion.

DESCRIPTION OF THE PREFERRED EMBODIMENTS

Figure 1:
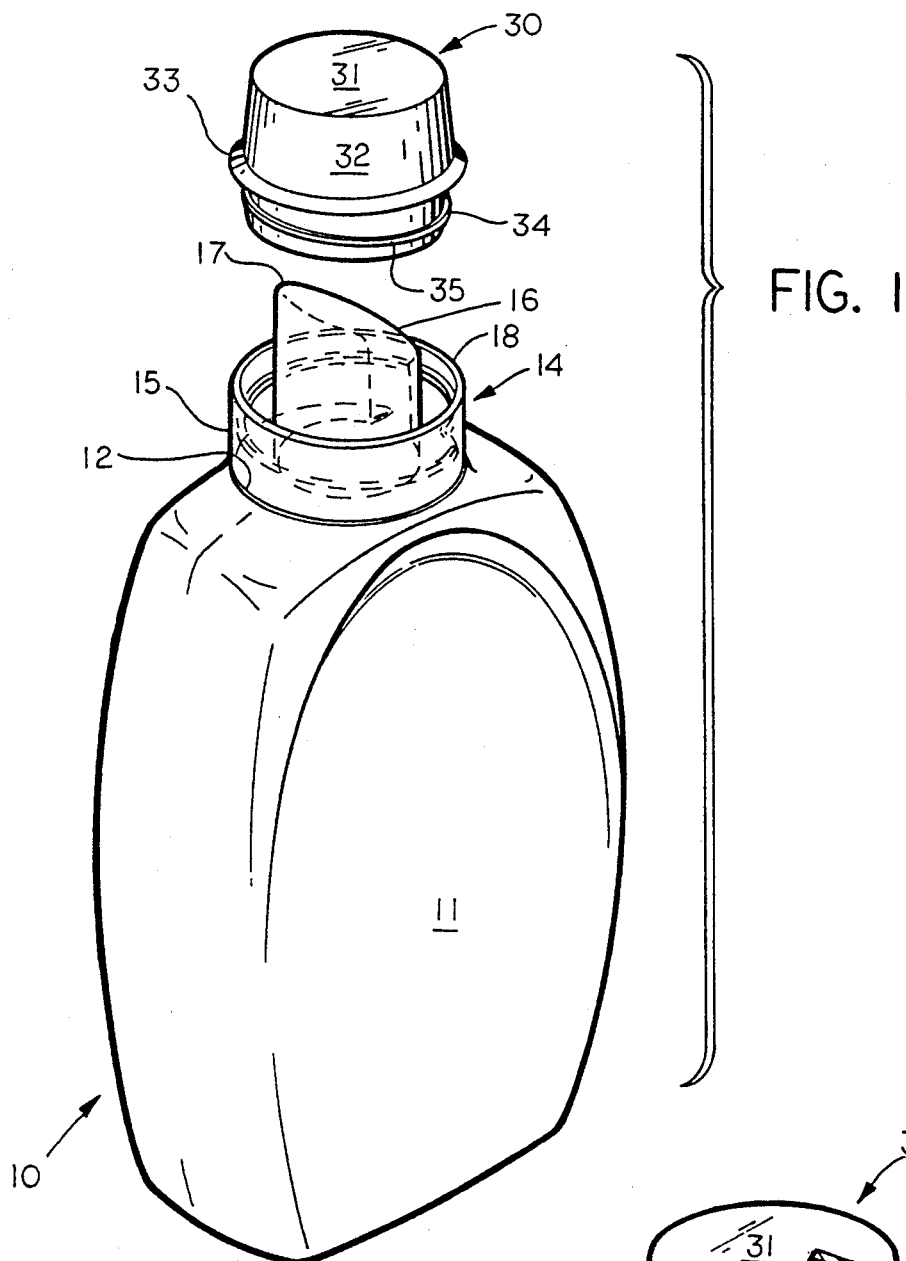
FIG. 1 is a perspective view showing a container, according to the present invention, with a cap positioned above the container.

A self-draining container, according to the present invention, is generally indicated by the reference number 10. While the self-draining container 10, depicted in the drawings, is a plastic bottle specifically designed for liquids, other self-draining containers which fall within the scope of the present invention may be constructed of other materials and used to contain liquids, powders or granules.

The self-draining container 10 includes a body portion 11 which terminates in an opening 12 through which the contents of the container 10 can be dispersed.

An integrally formed dispensing portion 14 extends from and communicates with the body portion 11. The dispensing portion 14 includes a circular wall 15 which extends annularly around the body opening 12. A dispensing spout 16 is located within and is encircled by the wall 15. The dispensing spout 16 includes an upper end 17 which extends above a top 18 of the wall 15.

A connecting web 20 extends between the wall 15 from an elevation below the top 18 to the dispensing spout 16. The web 20 connects the wall 15 and the dispensing spout 16 and cooperates with the wall 15 and the dispensing spout 16 to define a channel 21 into which fluid flowing from the exterior of the dispensing spout 16 may drain when the container 10 is uprighted after it has been inverted for pouring. The web 20 extends at least halfway around the dispensing spout 16 to prevent flow of liquid into the channel 21 when the container 10 is partially inverted to a pouring position.

A drain opening 23 is provided adjacent the channel 21. Fluid which is received in the channel 21 may drain back into the body 11 of the container 10 after the container is uprighted subsequent to pouring. In the embodiment shown in FIGS. 1-3, the drain opening 23 is defined by both the dispensing spout 16 and the web 20.

However, in other embodiments, the channel 21 may be continuous having only a step portion with the drain being defined solely by the dispensing spout (not shown).

Figure 3:
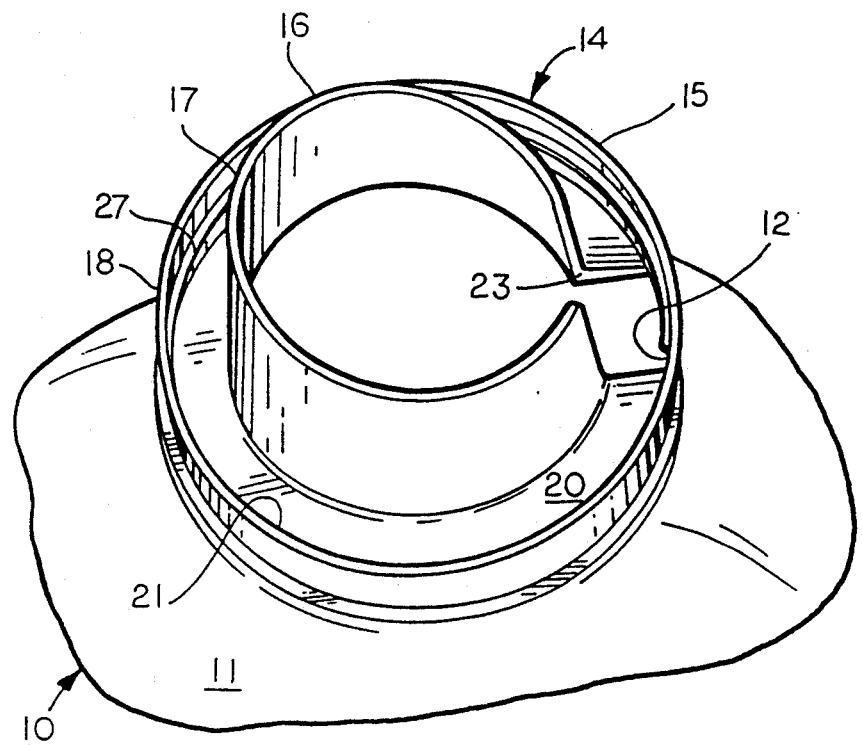
FIG. 3 is an enlarged section view of the upper part of the container shown in FIG. 1.
Figure 4:
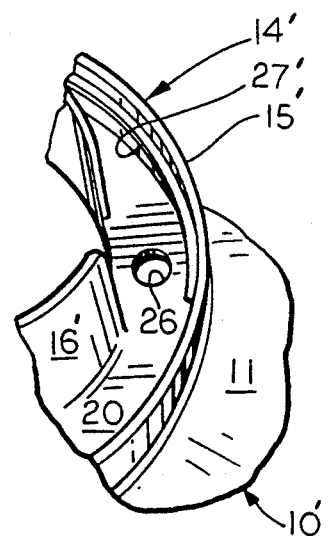
FIG. 4 is a fragmentary view of another embodiment of a container, according to the present invention.

Another embodiment of the invention is shown in FIG. 4. In this embodiment, a drain opening 26 comprises a circular hole which extends through the web 20'. In both embodiments, shown in FIGS. 3 and 4, the drain opening 23 or the drain opening 26 is in an opposed relationship to the upper end 17 of the dispensing spout 16 or 16'.

Threads 27 are formed on the inside of the circular wall 15. Similarly, threads 27' are formed on the inside wall 15' of the FIG. 4 embodiment. Referring to FIG. 1, a closure or cap 30 includes a top 31 and a depending sidewall 32. A sealing ring 33 extends radially outwardly from the sidewall 32 and a cylindrical skirt 34 depends downwardly below the ring 33. External threads 35 are formed on the exterior surface of the skirt 34 and cooperate with the threads 27 defined on the interior wall 15 of the container 10.

It is understood that in other embodiments of the present invention, the threads may be located on the exterior wall and mate with cap threads located on the interior of the cap.

Figure 2:
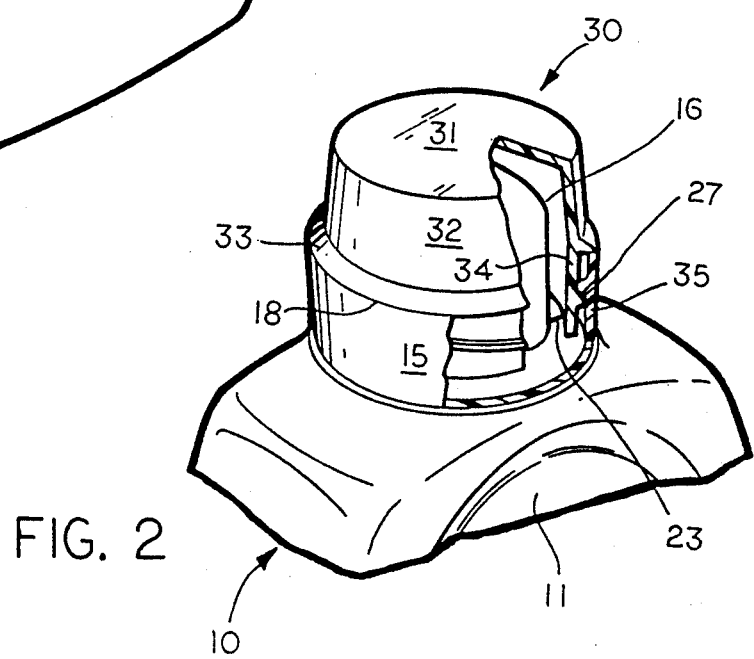
FIG. 2 is a fragmentary view of the top part of the container with the cap in place.

FIG. 1 shows the cap 30 removed, while FIG. 2 shows the cap 30 in position on the container 10. When in the closed position, as shown in FIG. 2, the sealing ring 33 of the cap 30 engages the top 18 of the wall 15 of the container 10 to provide a proper seal.

Figure 5:
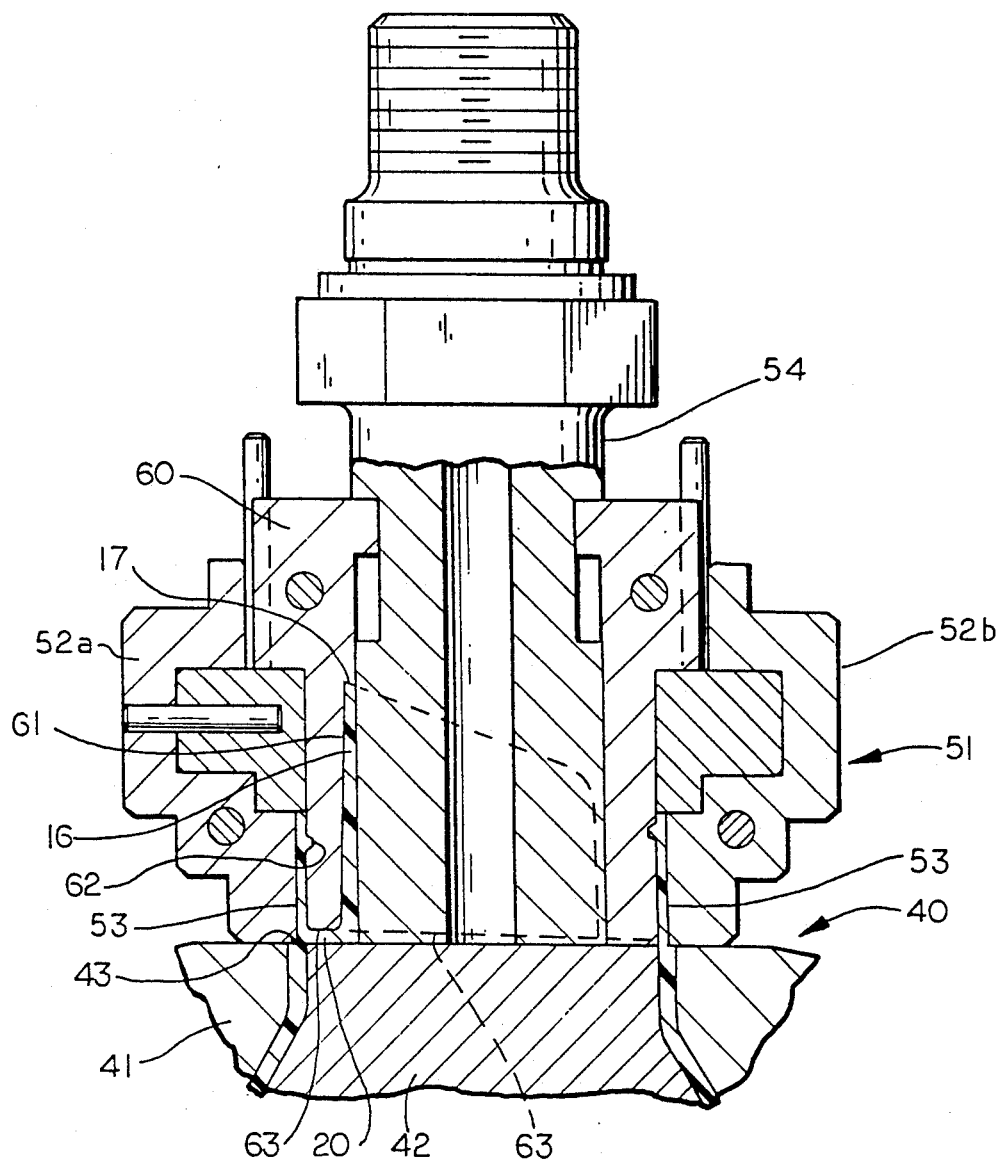
FIG. 5 is a fragmentary view, partially in cross section, showing the finish portion of a container according to the present invention, being formed in a molding machine.

Referring to FIG. 5, the self-draining container 10 may be produced within the normal cycle of a blow molding machine of a type used by the assignee of the present invention known as a BC-3 machine. No post-molding operations are needed to produce the desired self-draining finish on this type of machine. A portion of a BC-3 machine is generally indicated by the reference number 40. Details of a BC-3 machine method are disclosed in Sherman U.S. Pat. No. 2,804,654, which is incorporated herein by reference. This type of blow molding may be characterized as injection-extrusion blow molding and is used by the assignee of the present invention and others with a machine designated as a BC-3 machine.

In the method utilized by the BC-3 machine, the upper neck or finish portion of the container is first injection molded in an injection mold. Upon completion of the injection molding step, the injection mold is raised from the orifice of the injection die head while a length of heated and plasticized tubing is extruded from the die head. The tubing is connected to the injection molded finish and is drawn upwardly as the tubing is extruded. After the proper length of tubing has been extruded, blow mold halves close around the tubing and air is introduced through the injection mold assembly to expand the tubing in the closed mold to form the remainder of the container. These steps are shown as described in U.S. Pat. No. 2,804,654.

In FIG. 5 the extrusion die is designated by the numeral 40 and includes a bushing 41 and mandrel 42 which cooperate to define an orifice 43 through which the heated and plasticized material is expelled. Also shown is a moveable neck ring assembly 51 which is mounted (by means not shown) for movement downwardly into engagement with the orifice 43 during the injection molding step and for movement upwardly during the extrusion step to draw the oncoming tubing away from the orifice 43. The neck ring assembly 51 includes neck ring halves 52a and 52b which can open and close radially and which have interior wall portions 53 against which the exterior surface of the annular wall 15 of the container is molded. Also included is a core pin 54 having a passageway extending longitudinally therethrough through which pressurized air may be introduced into the extruded tubing after such tubing is enclosed within the blow mold to thereby expand the tube in the blow mold and form the body of the container. The core pin 54 forms the interior surface of the spout 16 of the container.

A sleeve 60 encircles the core pin 54 and has a recess 61 of a configuration to form the upper end 17 and outer surface of the spout 16. The lower exterior portion of the sleeve 60 forms the interior surface of the annular wall 15 and has a thread recess 62 in which the threads 27 are molded. The lower end 63 of the sleeve 60 is angled such that during the injection molding step it is spaced from the mandrel for a major portion around its circumference to cooperate therewith to form the web 20 as shown at the left in FIG. 5 but is in contact with the mandrel for a minor portion as shown at the right in FIG. 5 to form the drain opening 23 (see FIG. 3) without the necessity of a post-forming operation.

Figure 6:
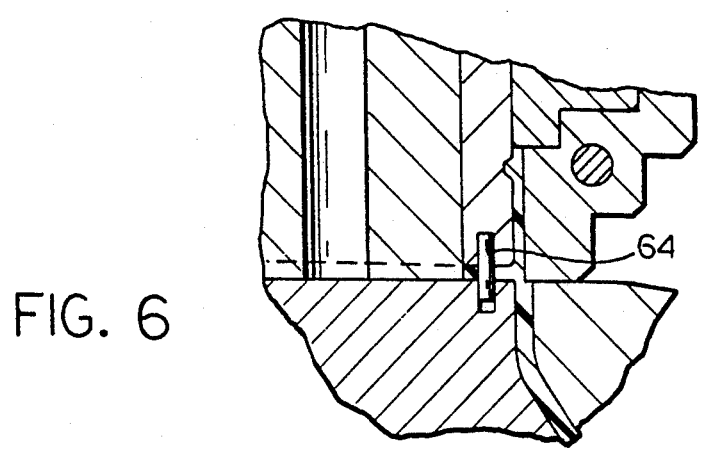
FIG. 6 is a fragmentary view, similar to FIG. 5 showing the finish portion of the FIG. 4 container embodiment being formed in a molding machine.

Similarly, referring to FIG. 6, a BC-3 machine may have a pin 64 mounted on the lower end of the sleeve 60 to form the drain opening 26 (see FIG. 4) of the self-draining container 10'. Again, the self-draining container 10' may be manufactured on a BC-3 machine without the necessity of post-forming operations on the bottle finish.

Referring now to FIGS. 7-13, there is shown an improved self-draining container 10" along with method and apparatus for forming and ejecting such container from the mold in which the spout, web and wall were injection molded.

Figure 7:
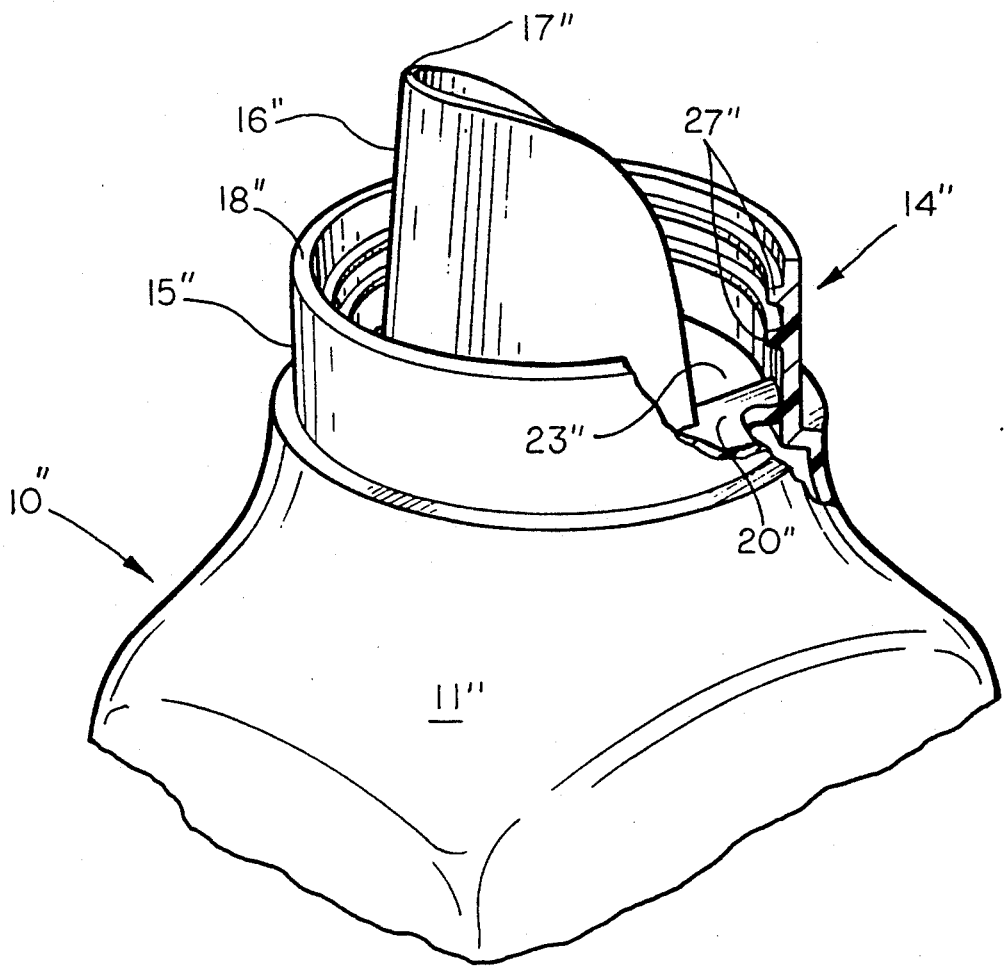
FIG. 7 is a partial perspective, partially in section, showing another embodiment of the present invention.

As indicated above, in forming bottles in accordance with the previous embodiment, difficulty has been encountered with distortion of the threads 27 molded into the interior surface of the circular wall 15. Thus, as can be seen in FIGS. 1, 2 and 5, the wall 15 has an internal thread 27 formed in a thread cavity 62 which may be characterized as a single thread, i.e., one having an arcuate extent on the order of one to one and one-half turns if it is desired to provide the same overlap between the leading upper end and trailing lower end. Referring to FIG. 7, there is provided a modified bottle 10" having a body portion 11" and a dispensing portion 14" which includes a cylindrical wall 15", a dispensing spout 16" encircled by said wall 15" and joined thereto by a web 20" having a drain opening 23". The spout includes an upper end 17" which extends above the top 18" of the wall 15". The inner surface of the wall 15" has formed therein a thread 27" which extends at least two complete turns so that any section cut axially through such wall 15" will have two separate and distinct portions of the thread 27". As previously mentioned it has been discovered, surprisingly, that forming a container having a spout 16" and encircling wall 15" with an internal thread 27" of such length, permits the container 10" to stripped from the injection mold without causing distortion to the thread 27".

Figure 8:
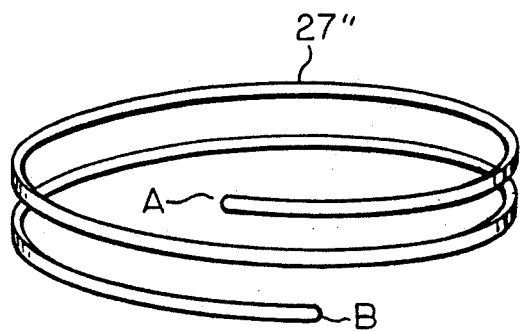
FIG. 8 is a schematic view illustrating the length of thread to be molded on the inner surface of the cylindrical wall.
Figure 9:
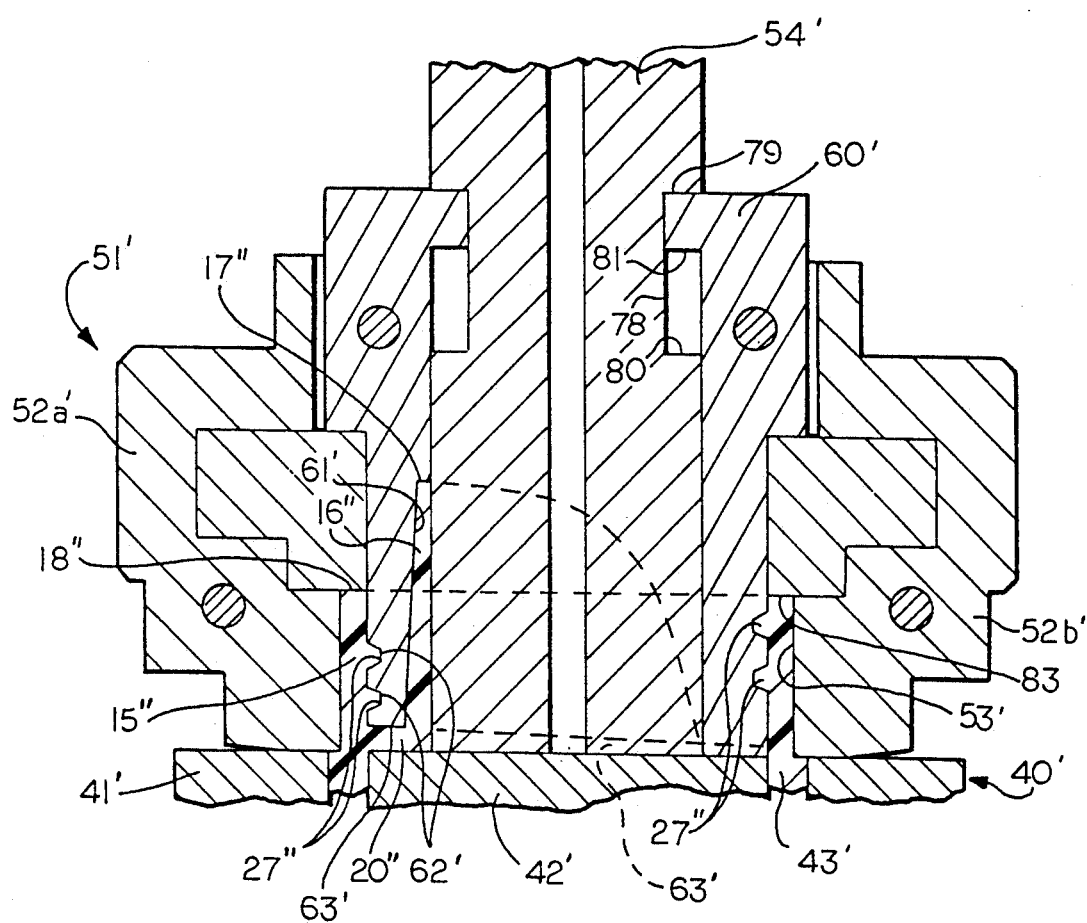
FIG. 9 is a sectional view showing apparatus for injection molding the spout web and annular wall of the modified invention.
Figure 10:
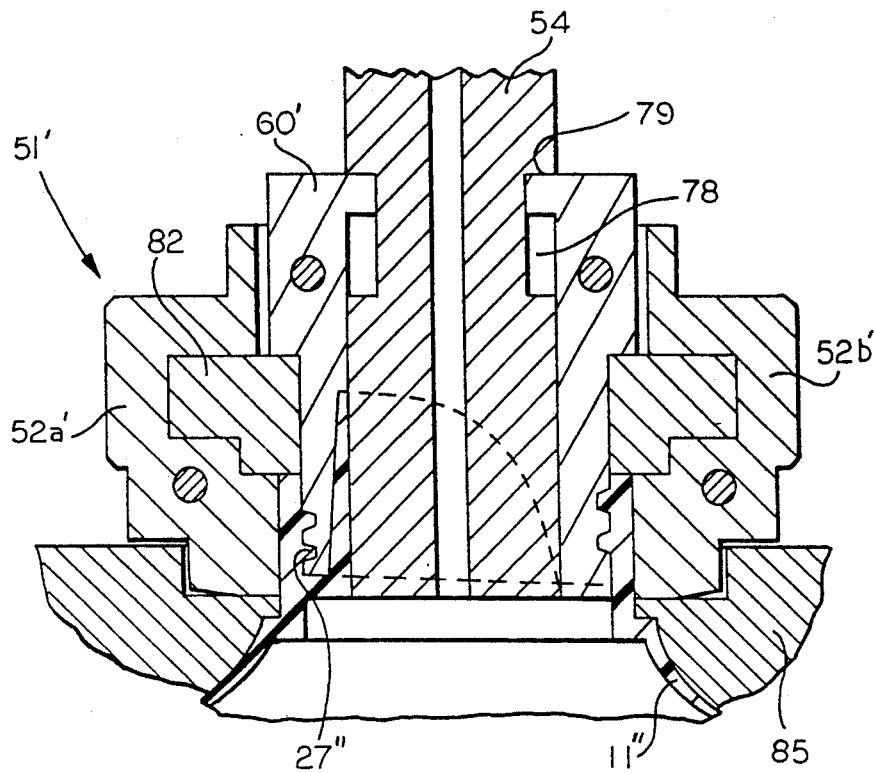
FIG. 10 is a sectional view showing apparatus for injection molding the spout, web and wall portion and showing a portion of a closed blow mold with the body portion of the container blown therein.

FIG. 8 shows schematically the length of the thread 27" as having a length slightly in excess of two full turns so that there is some overlap in the ends A and B with the result that a section taken through the wall 15" between the respective ends would pass through three thread segments.

Referring now to FIGS. 9-13, there is provided an extrusion die 40' having a bushing 41' and mandrel 42' which cooperate to define an orifice 43' through which heated and plasticized material is expelled. A moveable neck ring assembly 51' is mounted by means (not shown) for movement downwardly into engagement with the orifice 43' during the injection molding step and movement upwardly during the extrusion step to draw the oncoming tubing away from the orifice 43'. The neck ring assembly 51' includes neck ring halves 52a' and 52b' which can open and close radially and which have interior wall portions 53' against which the exterior surface of the wall 15" of the container is molded. Also included is a core pin 54' having a passageway extending longitudinally therethrough through which pressurized air may be introduced into the extruded tubing after such tubing is enclosed in a blow mold 85 to thereby expand the tube in the blow mold and form the body 11" of the container 10". (See FIG. 10). The core pin 54' forms the interior surface of the spout 16" of the container. The core pin 54' has a recessed area 78 extending from an upper ledge 79 to a lower ledge 80.

A sleeve 60' encircles the core pin 54' and has a recess 61' of a configuration to form the upper end 17" and the outer surface of the spout 16". The lower exterior portion of the sleeve 60' forms the interior surface of the wall 15" and has a thread recess 62' in which the thread 27" is molded. The length of the thread recess 62' is such as to provide at least two complete turns (i.e., 720°) so that in any axial section of the wall 15", there will always be at least two thread segments. This is true irrespective of where the axial section is taken throughout the entire 360° of the wall 15". The lower end 63' of the sleeve 60' is angled such that during the injection molded step, it is spaced from the mandrel for a major portion around its circumference to cooperate therewith to form the web 20". The upper end of the sleeve 60' is provided an inwardly extending flange 81 which is positioned in the recessed area 78 of the core pin 54'. A stripper ring 82 encircles the sleeve 60' and has a lower molding surface 83 which forms the upper surface 18" of the wall 15".

Figure 11:
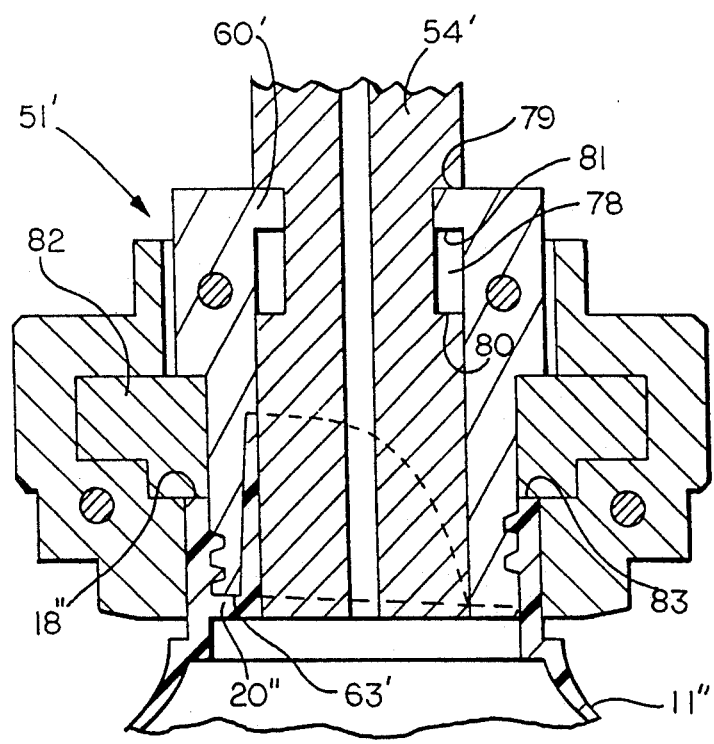
FIG. 11 is a sectional view showing apparatus for injection molding the spout, web and wall portion with a portion of a newly formed body of the container depending therefrom.
Figure 12:
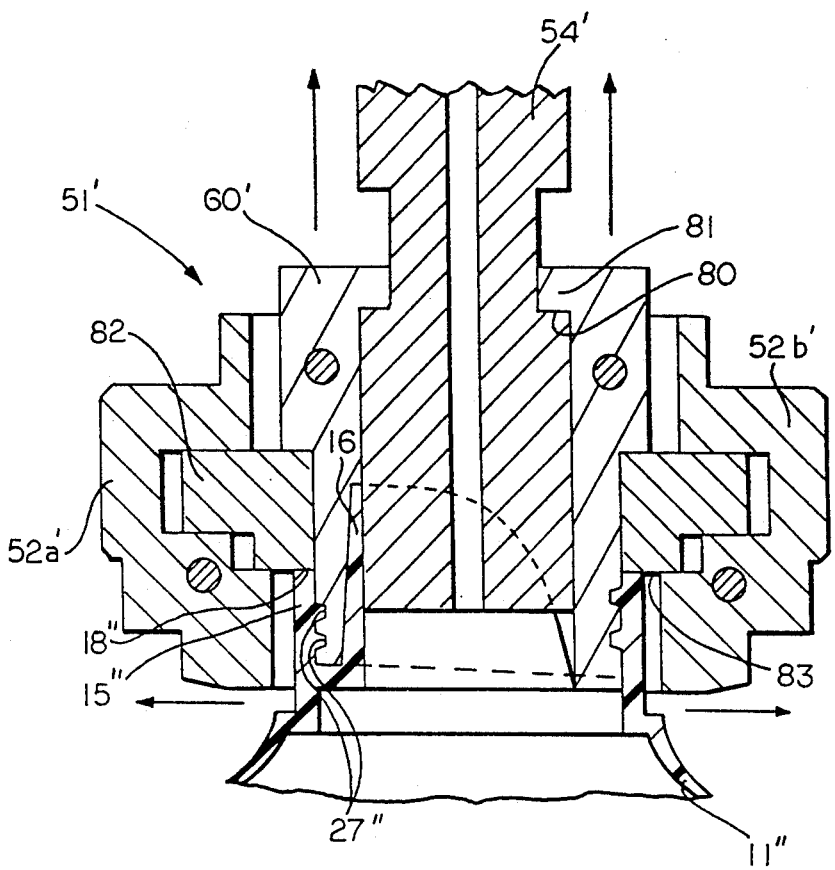
FIG. 12 is a view similar to FIG. 11 showing initial movement of portions of said injection molding apparatus during removal therefrom of the spout, web and wall with its depending newly formed body portion.
Figure 13:
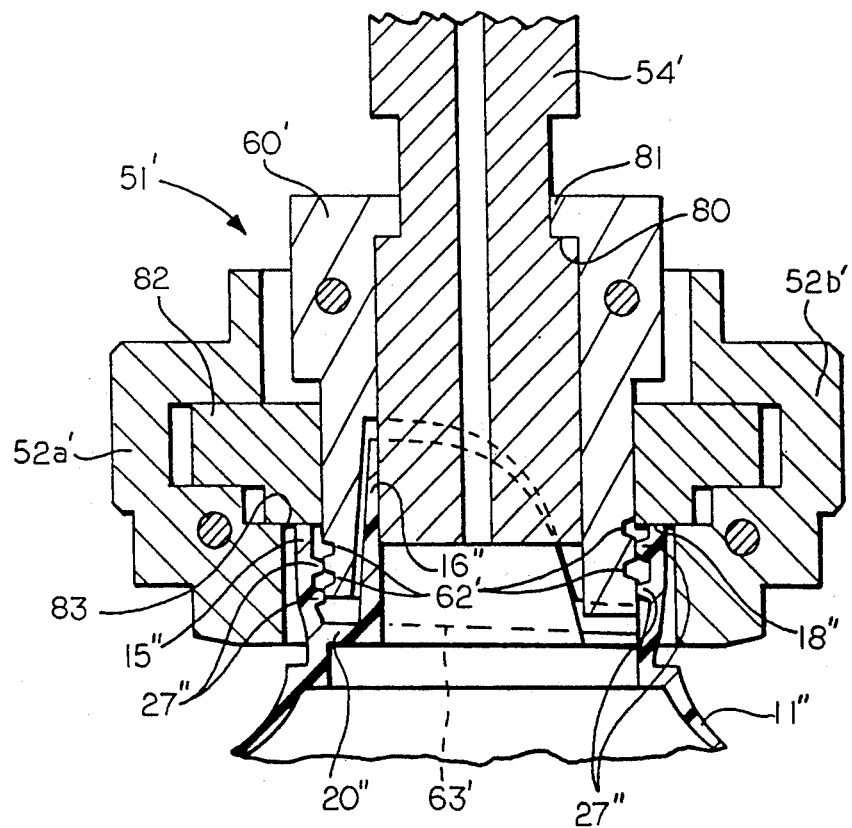
FIG. 13 is a view similar to FIGS. 11 and 12 showing further movement of the injection molding apparatus to strip the spout, web and wall therefrom.

Referring now to FIGS. 11-13, following blowing of the body portion 11" of the container 10", the spout 16", web 20", and wall 15" may be removed from the neck ring assembly 51'. This is normally done after the halves of the blow mold 85 in which the body portion 11" was molded have been opened. Such removal is accomplished by the sequence of steps hereinafter described. Initially, the neck ring halves 52a' and 52b' are moved to the partially open position shown in FIG. 12. Simultaneously with or immediately following the partial opening of the neck ring halves 52a' and 52b', the core pin 54' is elevated to partially withdraw it from the spout 16". Thereafter, the core pin 54' is moved further upwardly so that its ledge 80 engages the inwardly extending flange 81 of the sleeve 60'. Such engagement followed by continued upward movement of the core pin 54' draws the sleeve 60' upwardly. Engagement of the top 18" of the wall 15" against the lower molding surface 83 of the stripper ring 82 prevents upward movement of the container 10" as the sleeve 60' moves upwardly and thus causes the wall 15" with its internal thread 27" to be axially stripped therefrom. As can be seen particularly in FIG. 13, the thread 27" is forced radially out of the thread recess 62' of the sleeve 60' and is stretched over the sleeve portion adjacent the thread recess 62'. The stripping of containers having a thread with less than two full turns in this manner has resulted in thread distortion producing containers which, although functionally usable, were less than commercially desirable.

Many revisions and changes may be made to the various elements of the preferred embodiments of the self-draining container and its method of manufacture described above without departing from the scope of the following claims.

I claim:

1. A one-piece plastic container formed by a process in which
   (a) there is formed by injection molding
      (i) an upwardly extending dispensing spout;
      (ii) a web extending radially outwardly from the lower end of said dispensing spout; and,
      (iii) a cylindrical wall spaced radially outwardly of and encircling said dispensing spout formed in situ and cooperating with said dispensing spout and said web to define a channel into which liquid draining down the outside of said dispensing spout may be captured, said cylindrical wall having a predetermined diameter determining a cross-sectional size and having integrally molded closure retention means on the interior surface thereof; and,
   (b) there is formed by blow molding as part of the same process a body portion integral and in situ with and depending from the lower portion of said cylindrical wall, said body portion flaring outwardly from the lower end of said cylindrical wall to an area of enlarged cross-sectional size, means providing communication between the interior of said body portion and said channel.

2. A plastic container according to claim 1, wherein the means for communication between said body portion and said channel is an aperture formed during injection molding.

3. A plastic container according to claim 1, wherein said web has a circumferential extent more than 180° but less than 360°.

4. A plastic container according to claim 1, wherein the portion of said spout adjacent said web has a circumferential extent more than 180° but less than 360°.

5. A plastic container according to claim 1, wherein said integrally molded closure retention means comprises a thread extending at least two full turns.

6. A plastic container having a vertical axis comprising:
   an upwardly extending dispensing spout on or parallel with said vertical axis;
   a web integral and formed in situ with and extending radially outwardly from the lower end of said dispensing spout along a plane substantially perpendicular to said vertical axis;
   a cylindrical wall spaced radially outwardly of, integral and formed in situ with and extending axially from said web and encircling said dispensing spout and cooperating with said dispensing spout and said web to define a channel into which liquid draining down the outside of said dispensing spout may be captured, said cylindrical wall having a predetermined diameter determining a cross-sectional size and having integrally molded closure retention means on the interior surface thereof; and, a blow molded body portion integral and formed in situ with and depending from the lower portion of said cylindrical wall, said body portion flaring outwardly from the lower end of said cylindrical wall, all cross-section areas of said body portion having a size greater than the cross-sectional size said cylindrical wall, the interior of said body portion communicating with said dispensing spout and with said channel.

7. A plastic container according to claim 6, wherein said web has a circumferential extend more than 180° but less than 360°.

8. A plastic container according to claim 6, wherein the portion of said spout adjacent said web has a circumferential extent more than 180° but less than 360°.

9. A plastic container according to claim 6, wherein said integrally molded closure retention means comprises a thread extending at least two full turns.

10. A one-piece plastic container comprising:
a body portion terminating in an opening through which contents can be dispensed;
an integrally and in situ formed dispensing portion extending from and communicating with said body portion, said dispensing portion including:
a cylindrical wall portion extending around said body opening, said wall portion having an interior surface with a thread on such interior surface extending at least two full turns;
a dispensing spout located within and encircled by said wall portion, the upper end of said dispensing spout extending above the top of said wall portion;
a web portion connecting said dispensing spout to said wall portion below the upper end of said wall portion and cooperating with said wall portion and said dispensing spout to define a channel into which fluid poured through the dispensing spout when the container is inverted may drain when the container is uprighted, said web portion extending at least halfway around said dispensing spout to prevent flow of fluid into said channel when said container is partially inverted to a pouring position; and,
a drain opening adjacent said channel through which fluid in said channel may drain back to the body of the container when the container is uprighted.

11. A plastic container, according to claim 10, including a cap with a depending skirt having an exterior surface with threads formed thereon engaging said wall portion thread.

12. A plastic container according to claim 10, wherein all portions of said container other than the body portion are formed by injection molding and the body portion is thereafter formed by blow molding.

13. A unitary molded container having a drain-back neck to be used in conjunction with an externally threaded cup closure comprising:
a hollow container body having a mouth opening into a cylindrical wall forming the container neck, said wall terminating in an annular sealing lip and being internally threaded;
an annular flange below said threads inwardly directed from said wall toward said mouth opening;
a pouring spout concentric with said container neck extending from the periphery of said flange defining said mouth opening to a free end beyond said sealing lip;
said spout defining with said container neck and flange a collection chamber having an opening into said container mouth opening for flow of material accumulated therein when said container is in an upright position.

14. A unitary molded plastic container comprising:
a hollow body portion for containing liquids;
an integral in situ molded cylindrical wall, said wall extending from a lower end joined to said body portion to an upper end having a sealing lip and being internally threaded;
an integral in situ molded flange extending radially inwardly from said lower end, said flange having an inner end and an opening communicating with said body portion; and
an integral in situ molded pouring spout extending upwardly from said flange inner end and communicating with said body portion, no portion of said spout being positioned below said flange;
said spout defining with said wall and flange a collection chamber having an opening into said body portion.

15. A dispensing package comprising in combination:
(a) a unitary molded plastic container comprising: a hollow body portion for containing liquids;
an integral in situ molded cylindrical wall, said wall extending from a lower end joined to said body portion to an upper end having a sealing lip and being internally threaded;
an integral in situ molded flange extending radially inwardly from said lower end, said flange having an inner end and an opening communicating with said body portion; and
an integral in situ molded pouring spout extending upwardly from said flange inner end and communicating with said body portion, no portion of said spout being positioned below said flange;
said spout defining with said wall and flange a collection chamber having an opening into said body portion for flow of material accumulated therein when said container is in an upright position; and
(b) a closure engaged to said container, said closure having a depending skirt with an exterior surface, threads on said exterior surface engaged to said internally threaded wall and sealing means extending outwardly from said exterior surface above said threads engaging said sealing lip.

* * * * *